(12) United States Patent
Verbeke et al.

(10) Patent No.: US 10,885,819 B1
(45) Date of Patent: Jan. 5, 2021

(54) IN-VEHICLE AUGMENTED REALITY SYSTEM

(71) Applicant: HARMAN INTERNATIONAL INDUSTRIES, INCORPORATED, Stamford, CT (US)

(72) Inventors: Joseph Verbeke, San Francisco, CA (US); Sven Kratz, San Jose, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/530,935

(22) Filed: Aug. 2, 2019

(51) Int. Cl.
G02B 27/01 (2006.01)
G09G 5/00 (2006.01)
G09G 3/00 (2006.01)

(52) U.S. Cl.
CPC ......... *G09G 3/001* (2013.01); *G02B 27/0172* (2013.01); *G02B 27/0179* (2013.01); *G02B 2027/014* (2013.01); *G02B 2027/0187* (2013.01); *G09G 2354/00* (2013.01); *G09G 2380/10* (2013.01)

(58) Field of Classification Search
CPC ........ G02B 21/08; G02B 7/017; G02B 27/01; G02B 27/10; G02B 27/104; G02B 5/30; G02B 2027/0178; G02B 2027/013; G02B 2027/0181; G02B 2027/014; G02B 2027/0187; G06F 3/012; G06F 3/013; G06F 3/147; G06F 2203/04804; G06T 19/006; G06T 2207/30204; G09G 1/14; G09G 5/00; G09G 5/14; G09G 5/38; G09G 2340/0464; G09G 2380/01; G09G 2380/12; H04N 13/282; H04N 13/344; H04N 13/383
See application file for complete search history.

(56) References Cited

U.S. PATENT DOCUMENTS 8,121,319 B2 * 2/2012 Azizi ................... G01S 5/186
  381/306
8,179,604 B1 * 5/2012 Prada Gomez .... G02B 27/0093
  345/8
8,223,024 B1 * 7/2012 Petrou ................. G06F 3/011
  340/573.1

(Continued)

OTHER PUBLICATIONS

Grubert et al., A Survey of Calibration Methods for Optical See-Through Head-Mounted Displays, IEEE Transactions on Visualization and Computer Graphics, Sep. 2017, pp. 1-16. transarXiv: 1709.04299v1 [cs.HC] Sep. 13, 2017.

*Primary Examiner* — Michael J Eurice
(74) *Attorney, Agent, or Firm* — Artegis Law Group, LLP (57) ABSTRACT

A system for displaying visual information to a user of a vehicle includes a projection system included in the vehicle and configured to project a first visual output onto a first projection surface of a head-mounted device of the user to cause at least a first portion of the visual information to be displayed to a first eye of the user; a position-tracking system included in the vehicle and configured to determine a location of the head-mounted device with respect to the projection system and an orientation of the head-mounted device with respect to the projection system; and a processor configured to execute instructions to cause the projection system to project the first visual output to the first projection surface based on the position and the orientation.

20 Claims, 6 Drawing Sheets

(56) References Cited

U.S. PATENT DOCUMENTS

| | | | | |
|---|---|---|---|---|
| 8,807,810 | B2* | 8/2014 | Sato | G01S 7/4911 362/538 |
| 9,794,475 | B1* | 10/2017 | Tome | H04N 1/00129 |
| 9,865,169 | B2* | 1/2018 | Gassmann | G08G 1/163 |
| 10,095,306 | B2* | 10/2018 | Welti | G06F 3/012 |
| 10,254,544 | B1* | 4/2019 | Melzer | G02B 27/017 |
| 10,573,074 | B1* | 2/2020 | Bull | G02B 27/0179 |
| 10,650,785 | B1* | 5/2020 | Tuomisto | G02B 27/0172 |
| 2006/0028400 | A1* | 2/2006 | Lapstun | H04N 13/344 345/8 |
| 2006/0152434 | A1* | 7/2006 | Sauer | G02B 27/0101 345/8 |
| 2007/0273610 | A1* | 11/2007 | Baillot | G08G 5/0069 345/8 |
| 2008/0170730 | A1* | 7/2008 | Azizi | G01S 5/186 381/310 |
| 2008/0186604 | A1* | 8/2008 | Amitai | G02B 27/0081 359/850 |
| 2009/0005961 | A1* | 1/2009 | Grabowski | G02B 27/01 701/532 |
| 2009/0017424 | A1* | 1/2009 | Yoeli | G09B 9/32 434/44 |
| 2012/0224062 | A1* | 9/2012 | Lacoste | G02B 27/01 348/148 |
| 2013/0188259 | A1* | 7/2013 | Nakamura | G02B 27/0101 359/630 |
| 2013/0188260 | A1* | 7/2013 | Matsushita | G02B 27/0101 359/632 |
| 2013/0194256 | A1* | 8/2013 | Gassmann | G08G 1/163 345/419 |
| 2013/0222381 | A1* | 8/2013 | Di Censo | G06F 3/0304 345/424 |
| 2014/0036374 | A1* | 2/2014 | Lescure | G02B 27/0101 359/630 |
| 2014/0091988 | A1* | 4/2014 | Masuda | G02B 27/0149 345/7 |
| 2014/0168261 | A1* | 6/2014 | Margolis | A63F 13/65 345/633 |
| 2014/0225915 | A1* | 8/2014 | Theimer | G02B 27/017 345/633 |
| 2014/0268353 | A1* | 9/2014 | Fujimura | G02B 27/01 359/630 |
| 2014/0272812 | A1* | 9/2014 | Hing | G09B 9/04 434/69 |
| 2014/0320973 | A1* | 10/2014 | Deubzer | G02B 27/01 359/630 |
| 2014/0368532 | A1* | 12/2014 | Keane | G06F 3/04815 345/619 |
| 2015/0023372 | A1* | 1/2015 | Boatright | H04L 12/4645 370/474 |
| 2015/0201834 | A1* | 7/2015 | Border | A61B 3/0041 351/206 |
| 2015/0212326 | A1* | 7/2015 | Kress | G02B 3/14 349/11 |
| 2015/0234186 | A1* | 8/2015 | Meadows | G02B 27/017 345/8 |
| 2015/0243068 | A1* | 8/2015 | Solomon | H01L 27/156 345/419 |
| 2015/0294505 | A1* | 10/2015 | Atsmon | G06F 3/04815 345/633 |
| 2015/0331236 | A1* | 11/2015 | Roth | H04N 9/31 348/48 |
| 2016/0086305 | A1* | 3/2016 | Watanabe | G06T 3/20 345/672 |
| 2016/0091715 | A1* | 3/2016 | Larson | G02B 27/0101 348/53 |
| 2016/0124231 | A1* | 5/2016 | Watanabe | B60K 35/00 359/633 |
| 2016/0178901 | A1* | 6/2016 | Ishikawa | G02B 27/0006 345/7 |
| 2016/0195727 | A1* | 7/2016 | Kuzuhara | H04N 5/74 359/633 |
| 2016/0220324 | A1* | 8/2016 | Tesar | A61B 90/25 |
| 2016/0286164 | A1* | 9/2016 | Kratz | G06T 7/246 |
| 2016/0341964 | A1* | 11/2016 | Amitai | G02B 27/0081 |
| 2017/0045941 | A1* | 2/2017 | Tokubo | A63F 13/53 |
| 2017/0199383 | A1* | 7/2017 | Machida | G02B 6/0033 |
| 2017/0293147 | A1* | 10/2017 | Tremblay | G02B 26/0833 |
| 2017/0357333 | A1* | 12/2017 | Balan | G02B 27/0172 |
| 2018/0045960 | A1* | 2/2018 | Palacios | G02B 27/10 |
| 2018/0084232 | A1* | 3/2018 | Belenkii | G02B 26/101 |
| 2018/0093177 | A1* | 4/2018 | Tokubo | A63F 13/53 |
| 2018/0157037 | A1* | 6/2018 | Kasazumi | G02B 27/0101 |
| 2018/0174368 | A1* | 6/2018 | Nix | H04W 4/024 |
| 2018/0322845 | A1* | 11/2018 | Machida | G09G 3/38 |
| 2019/0041980 | A1* | 2/2019 | Trythall | G02B 27/0179 |
| 2019/0187482 | A1* | 6/2019 | Lanman | G06F 3/011 |
| 2019/0204491 | A1* | 7/2019 | Hong | G02B 30/40 |
| 2019/0294261 | A1* | 9/2019 | Lohse | G06F 3/0325 |
| 2019/0354175 | A1* | 11/2019 | Torkos | G06F 3/0304 |
| 2019/0355090 | A1* | 11/2019 | Oto | G06T 3/00 |
| 2020/0089313 | A1* | 3/2020 | Himane | G06F 3/013 |
| 2020/0163723 | A1* | 5/2020 | Wolf | G02B 27/0093 |

* cited by examiner

IN-VEHICLE AUGMENTED REALITY SYSTEM

BACKGROUND

Field of the Embodiments

Embodiments of the present disclosure relate generally to augmented reality devices and, more specifically, to an in-vehicle augmented reality system.

Description of the Related Art

The traditional means for providing information to a vehicle operator is visually, through displays or instruments integrated into an interior surface of the vehicle. For example, in an automobile, a fuel gauge, speedometer, infotainment touchscreen, and the like are built into various dashboard surfaces. However, to view such displays, the vehicle operator is required to look down and away from the windshield. Thus, reading one or more such instruments or displays requires the vehicle operator to focus his or her attention away from the current direction of travel. Further, after reading a dash-mounted instrument or display in this way, the vehicle operator then must refocus his or her eyes from the nearby instrument or display to the more distant environment outside the vehicle, which requires additional time and can be fatiguing with frequent iterations.

To address the above shortcomings and provide an improved user experience, various types of heads-up display (HUD) and head mounted display (HMD) technologies are being developed for use in automobiles. While such information display technologies have achieved a certain level of maturity, there are still several issues that are commonly encountered when implementing these augmented (AR) reality technologies in automobiles.

In the case of HUDs, the area available for providing AR content is relatively small and therefore greatly limits how much information can be provided to a vehicle operator. For example, when the HUD is projected onto a dedicated surface (a combiner) disposed between the operator and the windshield, the available viewing area generally cannot be more than about the size of a postcard. Alternatively, when a portion of the windshield is employed as the combiner, the field of view of the HUD can be increased somewhat, but is still quite limited. In addition, the field of view of an HUD is generally fixed in location and therefore can provide AR content only when the vehicle operator is looking directly ahead, but cannot provide AR content within the vehicle or when the operator looks to either side.

In the case of HMDs, a large field of view is possible, since AR content can be displayed independently of the direction the user is facing. However, the electrical power, computational load, and data connections needed for the operation of an HMD result in a relatively bulky device. Wearing such a device for extended periods, particularly in while operating a vehicle, can be cumbersome and uncomfortable.

In light of the above, more effective techniques for providing augmented reality content to the operator of a vehicle would be useful.

SUMMARY

The various embodiments set forth a system for displaying information to a user of a vehicle. The system includes a projection system included in the vehicle and configured to project a first visual output onto a first projection surface of a head-mounted device of the user to cause at least a first portion of the visual information to be displayed to a first eye of the user; a position-tracking system included in the vehicle and configured to determine a location of the head-mounted device with respect to the projection system and an orientation of the head-mounted device with respect to the projection system; and a processor configured to execute instructions to cause the projection system to project the first visual output to the first projection surface based on the position and the orientation.

At least one advantage of the disclosed embodiments is that a vehicle operator can receive augmented reality content over a very wide field of view without wearing a bulky and uncomfortable head-mounted device. Another advantage is that the vehicle operator can receive augmented reality content that is perceived to be within the vehicle as well as augmented reality content that is perceived to be outside the vehicle.

BRIEF DESCRIPTION OF THE SEVERAL VIEWS OF THE DRAWINGS

So that the manner in which the above recited features of the one or more embodiments can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
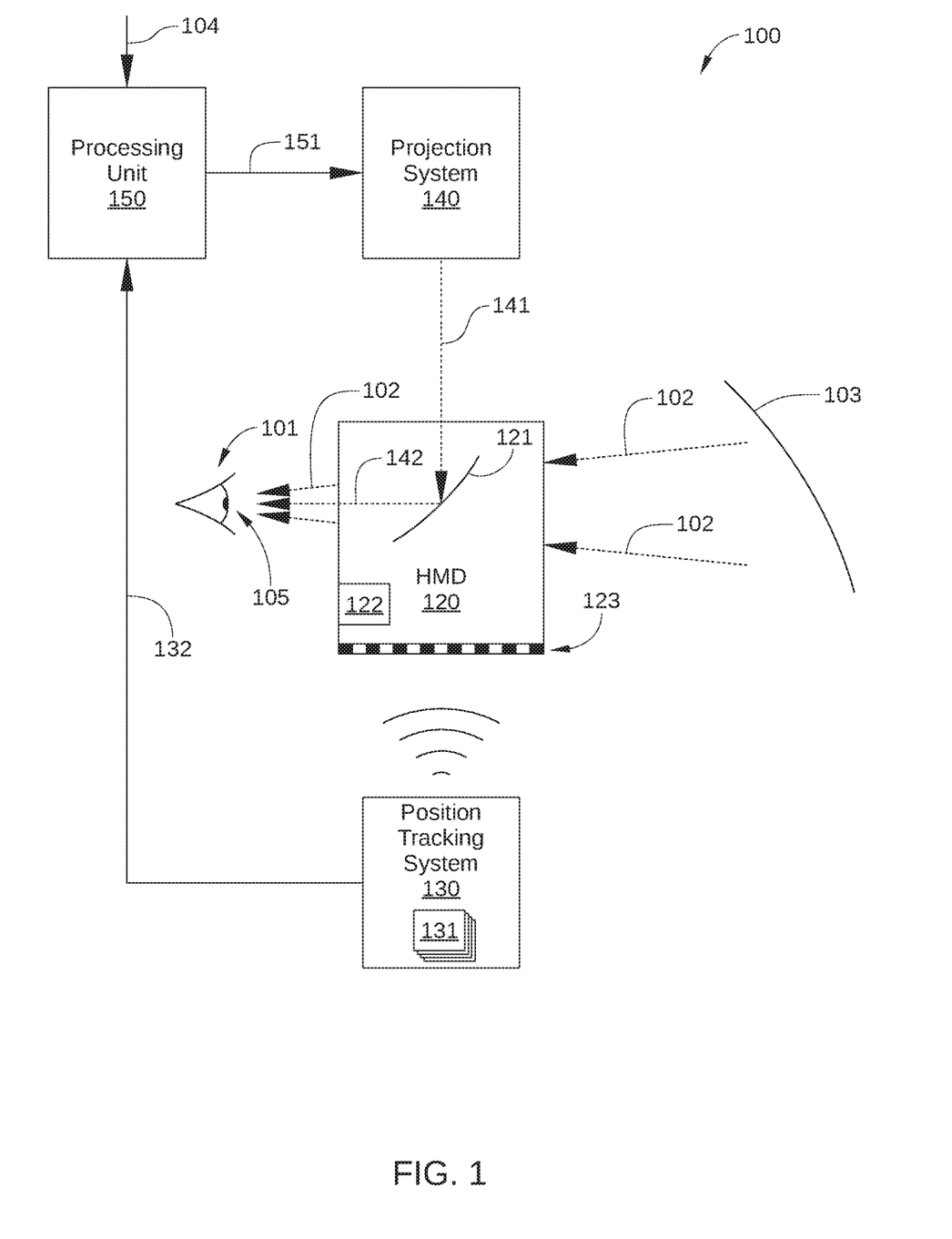
FIG. 1 is a schematic diagram illustrating an augmented reality display system, configured to implement one or more aspects of the present disclosure.

FIG. 1 is a schematic diagram illustrating an augmented reality (AR) display system 100, configured to implement one or more aspects of the present disclosure. AR display system 100 provides AR content to an operator, occupant, or other user of a vehicle, such as an automobile, watercraft, or the like. More specifically, AR display system 100 is configured to direct AR visual information 141 to at least one eye 101 of the user via a head-mounted device (HMD) 120 worn by the user. Because HMD 120 also allows environmental light 102 to enter eye 101 of the user, the user can simultaneously see the actual environment with AR visual information 141 superimposed thereon. In addition, unlike a heads-up display, HMD 120 does not rely on a fixed reflective device to direct AR visual information 141 to eye 101. Instead, HMD 120 includes at least one combiner 121 to enable the user to see the actual environment and AR visual information 141. As an element of HMD 120, combiner 121 moves in tandem with the head of the user, and therefore is disposed in the field of view of eye 101 regardless of the current orientation of the head of the user. As a result, HMD 120 can direct AR visual information 141 to eye 101 even when the head of the user is not oriented directly forward and toward a windshield 103 of the vehicle.

AR display system 100 includes, without limitation, HMD 120, which is worn by a user of a vehicle, and a position tracking system 130, a projection system 140, and a processing unit 150, which are integrated into the vehicle.

HMD 120 is worn by a user of a vehicle, such as the driver of an automobile, and directs AR visual information 141 to eye 101. Because most of the functionality of AR display system 100 resides in components that are external to HMD 120, HMD 120 can be a relatively lightweight and unobtrusive device. Further, in some embodiments, HMD 120 only includes mechanically passive devices that do not include controllable components. As a result, in such embodiments, HDM 120 does not require power or computational resources. For example, in some embodiments, HMD 120 is configured as a pair of glasses or lightweight goggles. In some embodiments, HMD 120 is configured to direct AR visual information 141 to a single eye, and in such embodiments, HMD 120 can be configured as a single eye piece or single-lens device. HMD 120 includes, without limitation, at least one combiner 121 and, in some embodiments, one or more eye-tracking sensors 122 and/or one or more positional markers 123.

Combiner 121 typically includes a curved projection surface configured to optically modify AR visual information 141 by changing the apparent optical distance from eye 101, for example via focusing. In some embodiments, combiner 121 is configured to alter AR visual information 141 into post-combiner AR visual information 142. In such embodiments, post-combiner AR visual information 142 has an apparent optical distance from eye 101 that is selected to cause the user to perceive post-combiner AR visual information 142 at a targeted optical distance, such as outside of the vehicle. Thus, in such embodiments, post-combiner AR visual information 142 has a different perceived optical distance from eye 101 than that of AR visual information 141. In addition, combiner 121 is transparent or semi-transparent to environmental light 102, so that a portion of environmental light 102 that is incident on combiner 121 is transmitted by combiner 121 and continues on toward eye 101. For example, in some embodiments, combiner 121 includes a half-silvered layer or other optical coating selected to reflect at least a portion of AR visual information 141 toward eye 101. In some embodiments, the optical coating can be selected to reflect a specific narrow frequency band of light that is associated with AR visual information 141, thereby facilitating the transmission of a larger portion of environmental light 102 that is incident on combiner 121. Various embodiments of combiner 121 are described below in conjunction with FIGS. 4 and 5.

In some embodiments, eye-tracking sensors 122 are included in HMD 120. Specifically, in such embodiments, tracking of the position of eye 101 and/or a pupil 105 enables projection system 140 to direct AR visual information 141 to eye 101, such as when HMD 120 employs retinal projection. Eye-tracking sensors 122 can include any technically feasible sensors for tracking the current position and orientation of eye 101 and/or pupil 105, including, without limitation, optical, electrical potential, and the like. In some embodiments, eye-tracking sensors 122 are configured with a processing unit for determining a current position and orientation of eye 101 and/or pupil 105. Alternatively, image data generated by eye-tracking sensors 122 can be processed by processing unit 150, for example via an eye-tracking module, to determine the current position and orientation of eye 101 and/or pupil 105. In an alternative embodiment, eye-tracking sensors 122 are integrated into one or more surfaces of the vehicle.

In some embodiments, one or more positional markers 123 are disposed on an outer surface of HMD 120 to facilitate accurate determination of the current position and orientation of HMD 120 and/or combiner 121 with respect to projection system 140. Positional markers 123 can include any technically feasible marker, feature, or device that can enable position tracking system 130 to detect the current position and orientation of HMD 120 and/or combiner 121, including, without limitation, an optical reflector, an infrared reflector, a matrix barcode, a light source (such as a light-emitting diode), and the like.

Position tracking system 130 is configured to enable outside-in tracking of HMD 120, so that the position and orientation of HMD 120 relative to projection system 140 can be determined continuously and with very low latency. Position tracking system 130 includes one or more sensors 131 inside the vehicle and facing the user. The one or more sensors can be any technically feasible sensors or position tracking devices capable of detecting HMD 120 and determining the position and orientation of HMD 120 relative to projection system 140. In some embodiments, the one or more sensors are integrated into one or more interior surfaces of the vehicle, such as on the steering column, the ceiling, the dashboard, etc. Examples of suitable position tracking systems known in the art include, without limitation, Optitrack®, Vive Lighthouse, and other computer vision systems. Position tracking system 130 is further configured to transmit to processing unit 150 position and orientation information 132 indicating the current position and orientation of HMD 120 and/or combiner 121.

In alternative embodiments, one or more sensors 131 of position tracking system 130 are included in HMD 120 and enable an inside-out tracking of HMD 120. In such embodiments, sensors 131 may include an inertial measurement unit (IMU), which is an electronic device configured to measure and report a specific force, angular rate, and/or orientation of a body (e.g., HMD 120), using a combination of accelerometers, gyroscopes, and/or magnetometers. Alternatively or additionally, in such embodiments, sensors 131 can include one or more optical sensors configured to key off certain surfaces inside the vehicle. In either case, in such embodiments, some or all of position tracking system 130 can be included within HDM 120. Alternatively, in such embodiments, the one or more sensors 131 included in HDM 120 can provide complementary information to a position tracking system 130 that is external to HDM 120. For example, the one or more sensors 131 included in HDM 120 can provide complementary position information to position tracking system 130 when the external outside-in tracking system temporarily fails due to loss of line of sight, low light, over bright light, or other factors.

Projection system 140 is an optical projection system configured to direct light onto one or more projection surfaces of HMD 120, such as combiner 121, and thus provide AR content to a user wearing HMD 120. For example, in some embodiments, visual projection system 140 is configured to project an image or images, a geometrical pattern or shape, a series of lines and/or curves, and/or a gauge or display onto combiner 121.

Projection system 140 includes one or more short-throw light projection devices (not shown in FIG. 1) that are disposed within the vehicle. The one or more projection devices are oriented to enable projection onto combiner 121 even as combiner 121 is moved over a wide range of orientation angles. Thus, in some embodiments, some or all of the light projection device disposed within the vehicle are positioned to reach combiner 121 while the user's head is in any range of orientations. In some embodiments, the range of orientations can include the user tilting his or her head downward at a significant angle, in which case one or more of the projection devices are positioned to project AR visual information 141 onto combiner 121 from below. In some embodiments, the one or more short-throw light projection devices are integrated into one or more interior surfaces of the vehicle, such as on the ceiling, the dashboard, etc. The short-throw light projection devices of projection system 140 can include, without limitation, a laser projection system, a liquid crystal display (LCD) projector, a three-dimensional (3D) projector, a video projector, or any other technically feasible system capable of projecting images onto one or more projection surfaces of HMD 120.

Figure 2A:
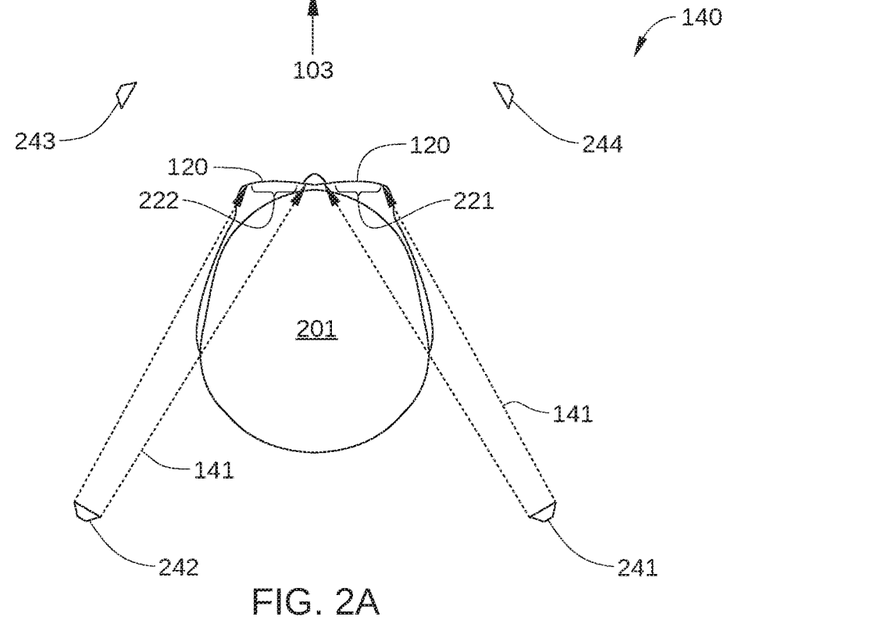
FIGS. 2A and 2B are schematic illustrations of a projection system of the augmented reality display system of FIG. 1, according to an embodiment of the present disclosure.
Figure 2B:
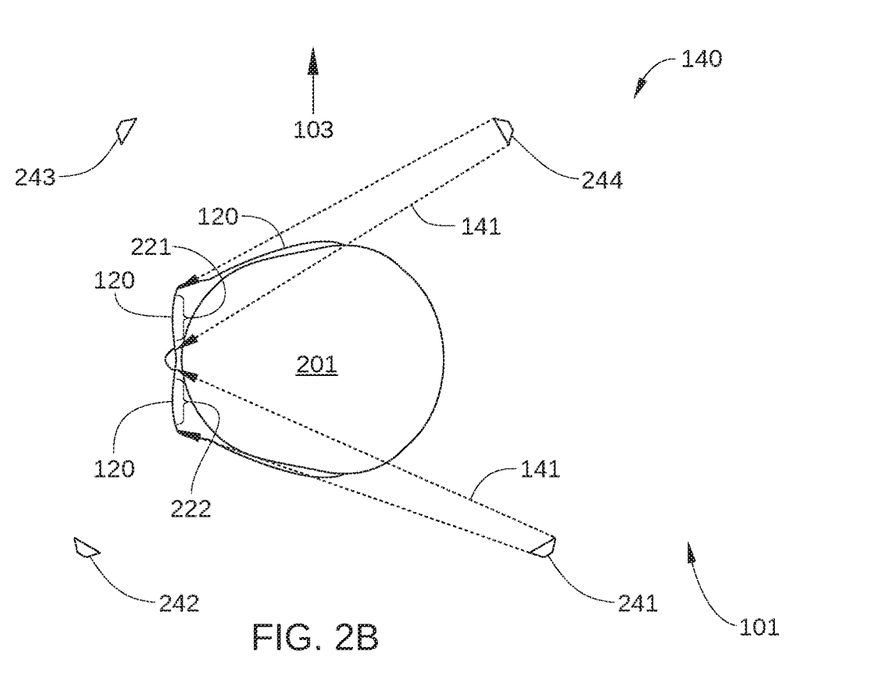

In some embodiments, multiple light projection devices of projection system 140 are distributed throughout the vehicle to enable the direction of AR visual information 141 to combiner 121 over a large field of view, including when the user turns his or her head to the left or right. One such embodiment is illustrated in FIGS. 2A and 2B. FIGS. 2A and 2B are schematic illustrations of projection system 140, according to an embodiment of the present disclosure. Also shown is a user's head 201, which is wearing HMD 120. In the embodiment illustrated in FIGS. 2A and 2B, projection system 140 includes a plurality of short-throw projectors 241-244, which are located in the ceiling of a vehicle and are disposed around user's head 201.

In FIG. 2A, user's head 201 is facing forward, for example toward windshield 103 of the vehicle. In this orientation of user's head 201, short-throw projector 241 is employed to project AR visual information 141 onto a first projection surface 221 of HMD 120 and short-throw projector 242 is employed to project AR visual information 141 onto a second projection surface 222 of HMD 120. In this way, AR visual content can be perceived by the user whenever facing forward.

In some embodiments, the AR visual information 141 being projected onto first projection surface 221 is identical to the AR visual information 141 being projected onto second projection surface 222. In such embodiments, the AR content perceived by the user wearing HMD 120 is monoscopic. Thus, in such embodiments, while the AR content seen by the user can be configured to appear at a particular optical distance from the user, such AR content will lack the perspective cues that occur when each eye sees a slightly different view of the same object or visual content. Alternatively, in other embodiments, the AR visual information 141 being projected onto first projection surface 221 is slightly different than the AR visual information 141 being projected onto second projection surface 222. Specifically, the AR visual information 141 being projected onto first projection surface 221 is adjusted to present a slightly different viewpoint than the AR visual information 141 being projected onto second projection surface 222. In such embodiments, the AR content perceived by the user wearing HMD 120 is stereoscopic, and is perceived by the user wearing HMD 120 as three-dimensional content.

In FIG. 2B, user's head 201 is facing to one side, for example to the left and away from windshield 103 of the vehicle. In this orientation of user's head 201, short-throw projector 244 is employed to project AR visual information 141 onto first projection surface 221 and short-throw projector 241 is employed to project AR visual information 141 onto second projection surface 222 of HMD 120. Similarly, when user's head 201 is facing to the right (not shown), short-throw projector 242 is employed to project AR visual information 141 onto first projection surface 221 and short-throw projector 243 is employed to project AR visual information 141 onto second projection surface 222 of HMD 120. Thus, the embodiment of projection system 140 illustrated in FIGS. 2A and 2B enables AR visual content to be perceived by the user even when facing away from windshield 103 and to the either side.

During operation, even small movements of user's head 201 can significantly vary the orientation of each projection surface of HMD 120 relative to the short-throw projector currently directing AR visual information 141 thereto. Such changes in orientation distort the visual content included in AR visual information 141 when perceived by the user. For example, as the angle of incidence between AR visual information 141 and a projection surface of HMD 120 changes, the path for light associated with each different portion of the visual content is affected differently, causing the user to perceive a skewed, cropped and/or otherwise distorted version of the visual content included in AR visual information 141. Consequently, to prevent such distortion of visual content as perceived by the user, AR visual information 141 is skewed, or otherwise distorted prior to being transmitted to HMD 120. In this way, distortion of AR visual information 141 associated with the current orientation between the receiving projection surface and the short-throw projector currently projecting AR visual information 141 to the receiving projection surface is compensated for. In some embodiments, the necessary signal processing capability for performing such preemptive skewing operations on AR visual information 141 resides in projection system 140. In other embodiments, such signal processing capability resides in processing unit 150. In either case, such preemptive skewing operations are based on position and orientation information 132 generated by position tracking system 130.

Processing unit 150 can be any computational platform configured to execute instructions for the operation of AR display system 100, position tracking system 130, and projection system 140, as described herein. One embodiment of processing unit 150 is described below in conjunction with FIG. 3.

Figure 3:
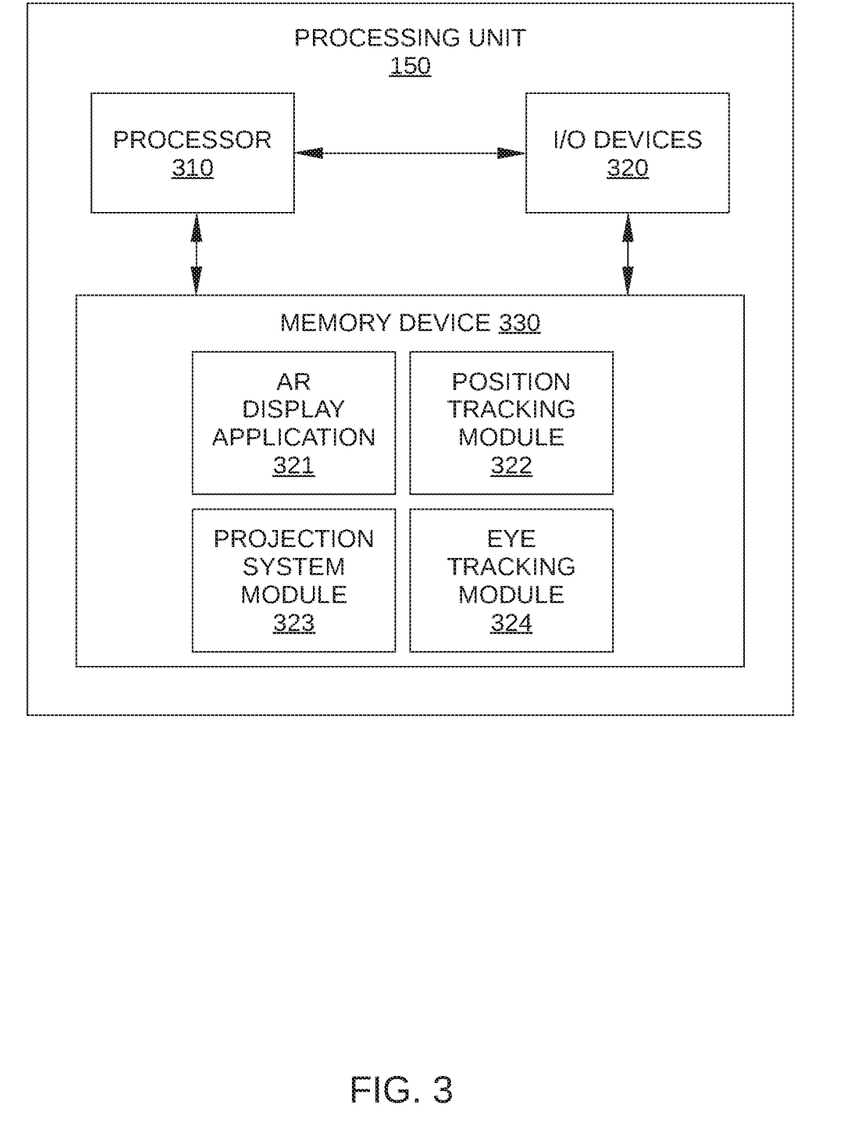
FIG. 3 is a conceptual block diagram of a computing device in the augmented reality display system of FIG. 1, according to an embodiment of the present disclosure.

FIG. 3 is a conceptual block diagram of processing unit 150, according to an embodiment of the present disclosure. Processing unit 150 is configured to implement at least one aspect of the present disclosure described herein. Processing unit 150 may be any type of device capable of executing application programs including, without limitation, instructions associated with an AR display application 321, a position tracking module 322, a projection system module 323, and, in some embodiments, an eye-tracking module 324. For example, and without limitation, processing unit 150 may be an electronic tablet, a smartphone, a laptop computer, etc. Alternatively, processing unit 150 may be implemented as a stand-alone chip, such as a microprocessor, or as part of a more comprehensive solution that is implemented as an application-specific integrated circuit (ASIC), a system-on-a-chip (SoC), and so forth. Generally, processing unit 150 is configured to coordinate the overall operation of AR display system 100. As shown, processing unit 150 includes, without limitation, a processor 310, input/output (I/O) devices 320, and a memory device 330.

Processor 310 may be implemented as a central processing unit (CPU), a graphics processing unit (GPU), an ASIC, a field programmable gate array (FPGA), any other type of processing unit, or a combination of different processing units. In general, processor 310 may be any technically feasible hardware unit capable of processing data and/or executing software applications to facilitate operation of AR display system 100 of FIG. 1, as described herein. Processor 310 may be physically embedded in processing unit 150, may be part of a cloud-based computing environment, and/or may be part of a computing device external to AR display system 100, such as a mobile computing device or a wearable computing device. In some embodiments, processor 310 is an element of an in-vehicle infotainment system included in AV 101. Among other things, and without limitation, processor 310 may be configured to execute instructions associated with AR display application 321, position tracking module 322, projection system module 323, and/or eye-tracking module 324.

AR display application 321 is configured to manage the operation of AR display system 100. In some embodiments, AR display application 321 is configured to receive display information 104 (shown in FIG. 1) from the vehicle to be presented to the user wearing HMD 120 as AR content via AR visual information 141. For example, display information can include, without limitation, visual navigation information, hazard indicators for hazards detected by the vehicle, vehicle operational information and/or warnings, information associated with the infotainment system of the vehicle, and the like. In addition, in some embodiments, AR display application 321 receives position and orientation information 132 from position tracking system 130, interprets such data, and determines modifications to AR visual information 141 to compensate for the current position and orientation of HMD 120 relative to the projectors of projection system 140. In some embodiments, AR display application 321 then modifies display information 104 and/or other AR content to appropriately compensate for the predicted skewing and/or distortion of the AR content and transmits the modified display information 104 and/or other AR content to projection system 140 as display data 151. In other embodiments, AR display application 321 transmits position and orientation information 132 and AR content to be displayed to projection system 140 as display data 151, and projection system 140 performs the appropriate modifications to compensate for predicted skewing and/or distortion of the AR content.

Position tracking module 322 is configured to receive position and orientation information 132 from position tracking system 130 and/or to control operation of position tracking system 130. Projection system module 323 is configured to control operation of projection system 140. For example, in embodiments in which projection system 140 does not include an integrated controller, projection system module 323 controls orientation and selection of the one or more short-throw light projection devices included in projection system 140. Eye-tracking module 324 is configured to control operation of and/or receive data from one or more eye-tracking sensors 122 (shown in FIG. 1) of HMD 120.

Memory 330 may include a random access memory (RAM) module, a flash memory unit, or any other type of memory unit or combination thereof, and may include a single memory module or a collection of memory modules. As shown, in some embodiments, some or all of AR display application 321, position tracking module 322, projection system module 323, and/or eye-tracking module 324 may reside in memory 330 during operation.

I/O devices 320 includes at least one device capable of both receiving input, such as a keyboard, a mouse, a touch-sensitive screen, a microphone, and gesture sensing imager, and so forth, as well as devices capable of providing output, such as a display screen, loudspeakers (including a loudspeaker associated with a headphone-based system), and the like. The display screen may be incorporated in AR display system 100 or may be external to AR display system 100, such as a computer monitor, an infotainment display screen of the vehicle, a display apparatus incorporated into a separate hand held device, or any other technically feasible display screen. In some embodiments, I/O devices 320 include one or more of sensors 131 in position tracking system 130.

In embodiments in which sensors 131 include gesture sensors, user input can be implemented by the user manipulating AR objects presented to the user. For example, in such embodiments, AR objects can be swiped away, grabbed, or otherwise moved, via user gestures. The gesture sensors can be incorporated into HMD 120 or integrated into one or more interior surfaces of the vehicle. Alternatively, in some embodiments, gesture sensing is combined with position tracking system 130. In such embodiments, sensors 131 may include camera-based sensors that are external to HMD 120, such as an infra-red (IR), or red-green-blue (RGB), or RGB depth camera. Such camera-based sensors enable tracking of the position and orientation of HMD 120 and the detection of hand gestures.

In the embodiment illustrated in FIG. 3, processing unit 150 is shown as a single integrated device. In other embodiments, some or all of the functionality of processing unit 150 described herein can be implemented as multiple computing devices, such as a computing device integrated into sensors 130 and/or a computing device integrated into projection system 140.

In some embodiments, the projection devices included in a projection system of AR display system 100 are disposed forward of the head of a user wearing HMD 120 in a vehicle. That is, in the horizontal plane, the projection devices are disposed between the head of the user and windshield 103 (shown in FIG. 1) of the vehicle. In such embodiments, HMD 120 can be configured with one or more additional optical elements to direct AR visual information to a combiner of HMD 120. One such embodiment is described below in conjunction with FIG. 4.

Figure 4:
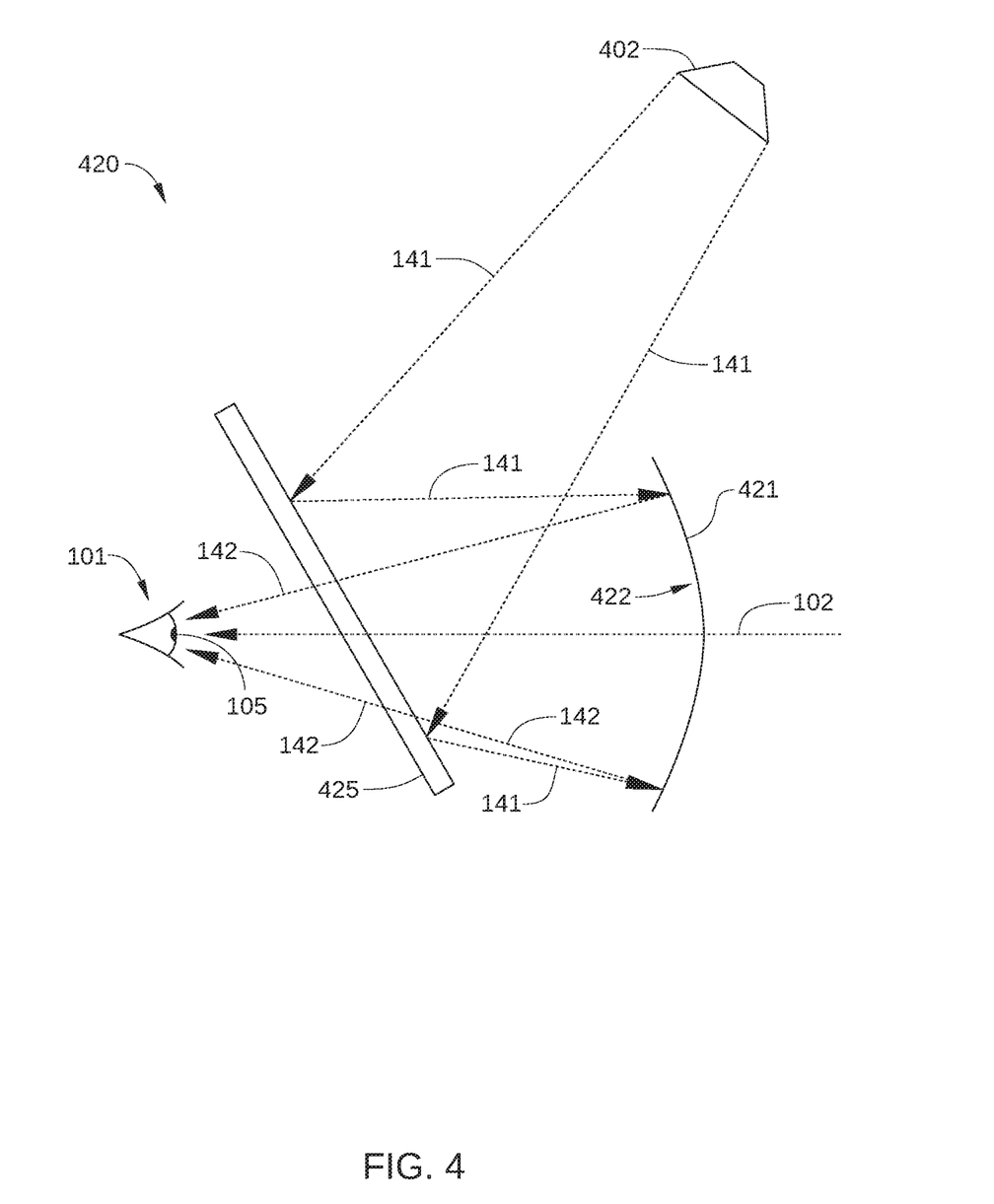
FIG. 4 is a schematic illustration of a head-mounted device when worn within a vehicle, according to an embodiment of the present disclosure.

FIG. 4 is a schematic illustration of an HMD 420 when worn within a vehicle, according to an embodiment of the present disclosure. HMD 420 is configured to receive AR visual information 141 from an in-vehicle projection system in which one or more of the projection devices 402 of the projection system are disposed between the head of the user and windshield 103 (shown in FIG. 1) of the vehicle. As shown, HMD 420 includes a combiner 421 and an auxiliary optical element 425.

Combiner 421 has at least one curved reflective surface 422 configured to reflect incident light having a first optical distance from pupil 105 and focus or otherwise modify the incident light to post-combiner AR visual information 142, which has a second optical distance that is different from the first optical distance. Combiner 421 is positioned to direct the modified incident light (i.e., post-combiner AR visual information 142) to pupil 105, so that the user perceives certain AR content associated with AR visual information 141. The second optical distance can be selected so that AR content so perceived by the user can appear to be located at a different distance from eye 101 than projection device 402. For example, such AR content can appear to be disposed within the cabin of the vehicle, outside the cabin of the vehicle, or a combination of both. In some embodiments, AR visual information 141 can have an optical distance from eye 101 that is equivalent to the optical distance associated with a ray traced from the projection device 402 to eye 101. Alternatively, in some embodiments, projection device 402 is configured to generate AR visual information 141 to have a specific optical distance from eye 101, for example infinity, to facilitate the generation of undistorted AR content for the user.

Auxiliary optical element 425 can be any technically feasible optical element configured to direct AR visual information 141 from projection device 402 to curved reflective surface 422. For example, in some embodiments, auxiliary optical element 425 can be a half-silvered or otherwise partially reflective mirror that causes a portion of AR visual information 141 to be reflected toward curved reflective surface 422 and allows a portion of post-combiner AR visual information 142 to be transmitted to eye 101. In such embodiments, auxiliary optical element 425 can include an optical coating selected to reflect a specific narrow frequency band of light that is associated with AR visual information 141, so that most of AR visual information 141 is reflected by auxiliary optical element 425 while most of environmental light 102 is transmitted through auxiliary optical element 425 to eye 101.

In some embodiments, the projection devices included in a projection system of AR display system 100 are disposed behind the head of a user wearing HMD 120 in a vehicle. That is, in the horizontal plane, the head of the user is disposed between the projection devices and windshield 103 (shown in FIG. 1) of the vehicle. In such embodiments, HMD 120 can be configured without the one or more additional optical elements described above in conjunction with FIG. 4. One such embodiment is described below in conjunction with FIG. 5.

Figure 5:
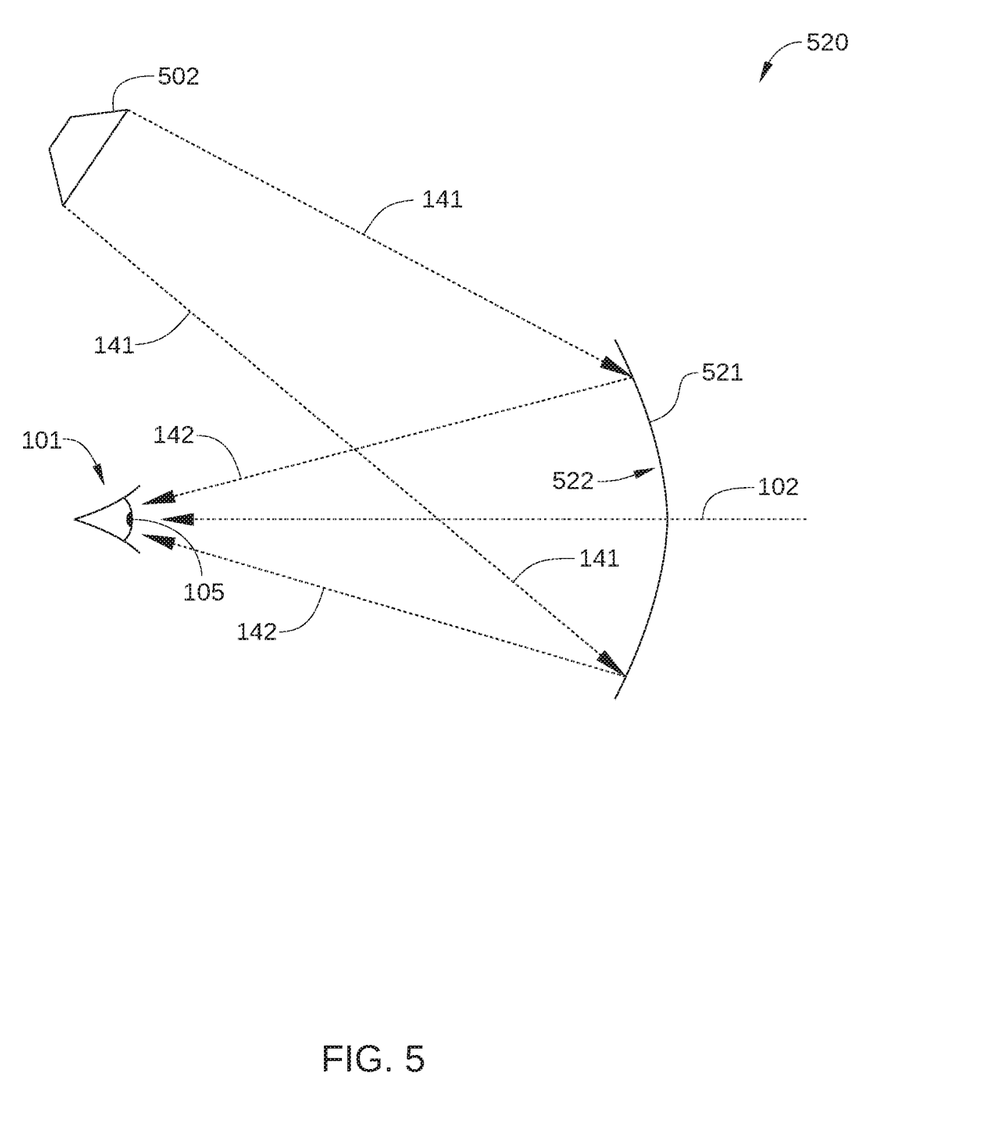
FIG. 5 is a schematic illustration of another head-mounted device when worn within a vehicle, according to an embodiment of the present disclosure.

FIG. 5 is a schematic illustration of an HMD 520 when worn within a vehicle, according to an embodiment of the present disclosure. HMD 520 is configured to receive AR visual information 141 directly from one or more of the projection devices 502 of an in-vehicle projection system, where the head of the user is disposed between projection devices 502 and windshield 103 (shown in FIG. 1) of the vehicle.

As shown, HMD 520 includes a combiner 521 disposed in front of eye 101. Combiner 521 can be substantially similar to combiner 421 in FIG. 4. That is, combiner 521 has at least one curved reflective surface 522 configured to reflect incident light having a first optical distance from pupil 105 and focus or otherwise modify the incident light to post-combiner AR visual information 142. In some embodiments, combiner 521 can be incorporated into HMD 520 as one or more lenses when HMD 520 is configured as a pair of glasses.

Figure 6:
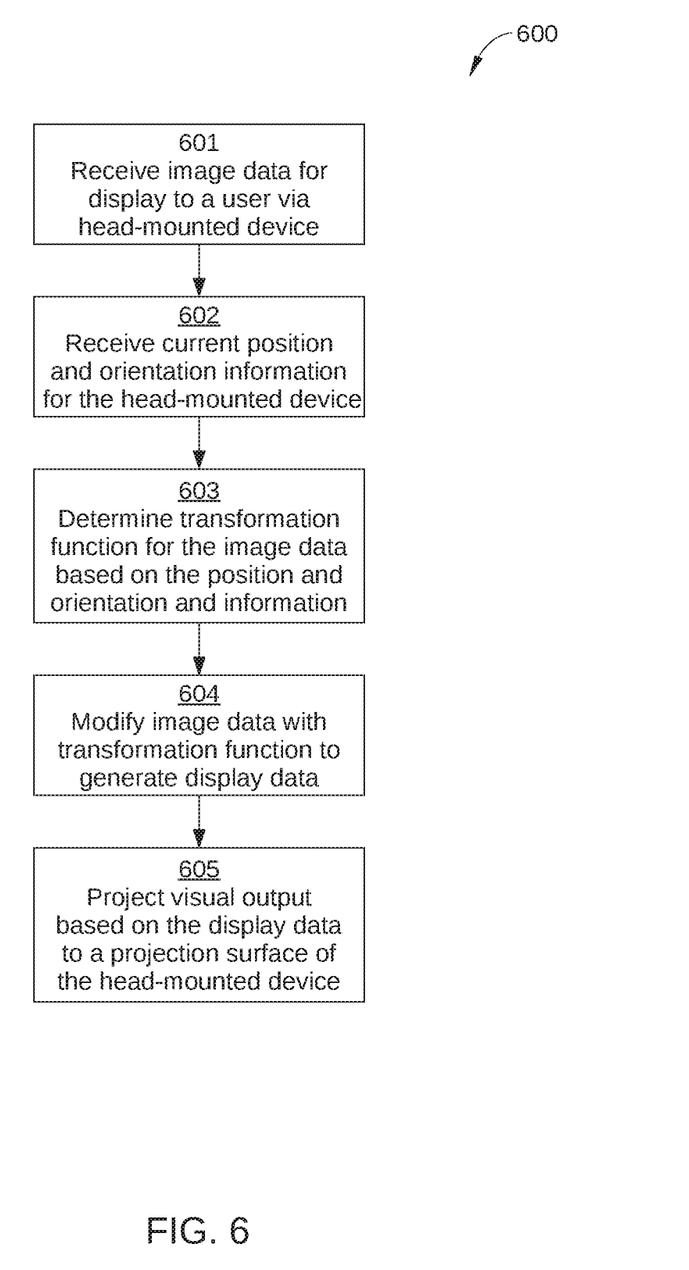
FIG. 6 is a flowchart of method steps for displaying visual information to the user of a vehicle, according to various embodiments of the present disclosure.

FIG. 6 is a flowchart of method steps for displaying visual information to the user of a vehicle, according to various embodiments of the present disclosure. Although the method steps are described with respect to the systems of FIGS. 1-5, persons skilled in the art will understand that any system configured to perform the method steps, in any order, falls within the scope of the various embodiments.

As shown, a method 600 begins at step 601, in which AR display system 100 receives image data that is for display via HMD 120 to the user wearing HMD 120. For example, navigation information and/or hazard information may be received from the vehicle sensors or control system.

In step 602, AR display system 100 receives current position and orientation information 132 for HMD 120 from position tracking system 130.

In step 603, based on position and orientation information 132, AR display system 100 determines a transformation function for the image data received in step 601. In some embodiments, the transformation function enables generation of a first portion of display data 151 for the projection of first visual output to a first projection surface of HMD 120 (e.g., a right lens of HMD 120) and a second portion of display data 151 for the projection of second visual output to a second projection surface of HMD 120 (e.g., a left lens of HMD 120). Thus, in such embodiments, the transformation function enables the provision of stereoscopic AR content to the user. In some embodiments, the transformation function enables compensation for the current orientation between the receiving projection surface(s) of HMD 120 and the projection device currently projecting AR visual information 141 to the receiving projection surface(s). Thus, in such embodiments, the transformation function prevents skewing and other distortion of AR content displayed to the user.

In step 604, based on the transformation function determined in step 603, AR display system 100 modifies the image data received in step 601 to generate display data 151. In some embodiments, display data 151 includes a suitable a projection direction for projecting AR visual information 151, which can be determined by projection system 140 or by processing unit 150. The projection direction is based on position and orientation information 132, as well as on the position and/or orientation of the projection device of projection system 140 that is selected to project AR visual information 151. As noted above in step 603, in some embodiments, display data 151 includes a first portion for a first projection surface of HMD 120 and a second portion for a second projection surface of HMD 120.

In step 605, based on display data 151, projection system 140 of AR display system 100 projects visual output (e.g., AR visual information 141) to a projection surface (e.g., combiner 121) of HMD 120, thereby providing AR content to a user wearing HMD 120. In some embodiments, the projection system projects the first visual output in the projection direction based on the position and the orientation In sum, various embodiments set forth systems and techniques for displaying visual information to the user of a vehicle. In the embodiments, AR visual information is directed to a user of a vehicle while wearing an HMD by projecting the AR visual information to a projection surface of the HMD from a projection system external to the HMD. In a preferred embodiment, the current position and orientation of the projection surface relative to the projection system is determined by a position-tracking system external to the HMD. In such embodiments, the HMD may not include active electronic components and require no power supply, such as a battery or power cable, no heat generating devices, such as an on-board processor, and no transceiver, which emits radio-frequency radiation close to the head.

At least one technological improvement of the disclosed embodiments is that a vehicle operator can receive augmented reality content over a very wide field of view without wearing a bulky and uncomfortable head-mounted device. Another advantage is that the vehicle operator can receive augmented reality content that is perceived to be within the vehicle as well as augmented reality content that is perceived to be outside the vehicle.

1. In some embodiments, a system for displaying visual information to a user of a vehicle comprises: a projection system included in the vehicle and configured to project a first visual output onto a first projection surface of a head-mounted device of the user to cause at least a first portion of the visual information to be displayed to a first eye of the user; a position-tracking system included in the vehicle and configured to determine a location of the head-mounted device with respect to the projection system and an orientation of the head-mounted device with respect to the projection system; and a processor configured to execute instructions to cause the projection system to project the first visual output to the first projection surface based on the position and the orientation.

2. The system of clause 1, wherein: the head-mounted device includes a second projection surface; and the projection system is further configured to project a second visual output onto the second projection surface to cause a second portion of the visual information to be displayed to a second eye of the user.

3. The system of clauses 1 or 2, wherein the processing unit is further configured to execute instructions to cause the projection system to project the second visual output to the second projection surface, and the first portion of the visual information is different than the second portion of the visual information.

4. The system of any of clauses 1-3, wherein the processing unit is further configured to execute instructions to generate the first portion of the visual information and the second portion of the visual information so that the user perceives the visual information stereoscopically.

5. The system of any of clauses 1-4, wherein the processing unit is further configured to execute instructions to generate the first portion of the visual information and the second portion of the visual information so that the user perceives at least a portion of the visual information to be located within the vehicle.

6. The system of any of clauses 1-5, wherein the processing unit is further configured to execute instructions to generate the first portion of the visual information and the second portion of the visual information so that the user perceives at least a portion of the visual information to be located outside the vehicle.

7. The system of any of clauses 1-6, wherein the projection system includes multiple projectors.

8. The system of any of clauses 1-7, wherein a first projector of the multiple projectors is configured to project the first visual output to the first projection surface when the user's head is in a first location with a first orientation and a second projector of the multiple projectors is configured to project the first visual output to the first projection surface when the user's head is in a second location with a second orientation.

9. The system of any of clauses 1-8, wherein: the head-mounted device includes a second projection surface; a first projector of the multiple projectors is configured to project the first visual output to the first projection surface; and a second projector of the multiple projectors is configured to project a second visual output to the second projection surface.

10. The system of any of clauses 1-9, wherein the first projection surface is included in a combiner that is configured to optically modify the first visual output by changing an apparent optical distance of the first visual output from the first eye.

11. The system of any of clauses 1-10, wherein the head-mounted device includes an auxiliary optical element configured to direct the first visual output to the first projection surface via the combiner.

12. The system of any of clauses 1-11, wherein causing the projection system to project the first visual output to the first projection surface based on the position and orientation comprises causing the projection system to project the first visual output in a projection direction based on the position and the orientation.

13. A method for displaying visual information to a user of a vehicle, the method comprising: receiving current position and orientation information for a head-mounted device of the user; based on the current position and orientation information, determining a transformation function to be applied to image data for display to the user; based on the transformation function, modifying the image data to generate display data; and based on the display data, projecting, via a projection device external to the head-mounted device, visual output to a projection surface of the head-mounted device.

14. The method of clause 13, wherein the current position and orientation information for the head-mounted device is received from a sensor external to the head-mounted device.

15. The method of any 13 or 14, further comprising, based on the current position and orientation information, selecting the projection device for projecting the visual output to the projection surface from a plurality of projection devices that are external to the head-mounted device.

16. The method of any of clauses 13-15, wherein modifying the image data to generate the display data comprises: generating a first portion of display data for the projection of first visual output to a first projection surface of the head-mounted device; and generating a second portion of display data for the projection of second visual output to a second projection surface of the head-mounted device.

17. The method of any of clauses 13-16, wherein projecting visual output to the projection surface of the head-mounted device comprises projecting the first portion of display data to the first projection surface and projecting the second portion of display data to the second projection surface.

18. A system for displaying visual information to a user of a vehicle, the system comprising: a projection system configured to be incorporated into the vehicle and to project a first visual output onto a first projection surface of a head-mounted device of the user to cause at least a first portion of the visual information to be displayed to a first eye of the user; a position-tracking system configured to be incorporated into the vehicle and determine a location of the head-mounted device with respect to the projection system and an orientation of the head-mounted device with respect to the projection system; and a processing unit configured to be incorporated into the vehicle and execute instructions to: generate the first visual output based on the location of the head-mounted device and the orientation of the head-mounted device; and cause the projection system to project the first visual output to the first projection surface.

19. The system of any of clauses 18, wherein the projection system includes at least one projection device configured to be installed on an interior surface of the vehicle.

20. The system of clauses 18 or 19, wherein the position-tracking system includes at least one position-tracking sensor configured to be installed on an interior surface of the vehicle.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for displaying visual information to a user of a vehicle, the system comprising:
   a projection system that includes a set of two or more projectors included in the vehicle, the projection system configured to project at least a first visual output onto a first projection surface of a head-mounted device of the user to cause at least a first portion of the visual information to be displayed to a first eye of the user;
   a position-tracking system included in the vehicle and configured to determine;
      a location of the head-mounted device with respect to the projection system, and
      an orientation of the head-mounted device with respect to the projection system; and
   a processing unit configured to execute instructions to cause the projection system to:
      select, from the set of projectors and based on the location and the orientation of the head-mounted device, a first projector, and
      project, via the first projector, the first visual output to the first projection surface.

2. The system of claim 1, wherein:
   the first projector is further configured to project the first visual output to the first projection surface when the head-mounted device is in a first location with a first orientation; and
   a second projector of the set of projectors is configured to project the first visual output to the first projection surface when the head-mounted device is in a second location with a second orientation.

3. The system of claim 1, wherein:
   the head-mounted device includes a second projection surface;
   the first projector is further configured to project the first visual output to the first projection surface; and a second projector of the set of projectors is configured to project a second visual output to the second projection surface.

4. The system of claim 1, wherein causing the projection system to project the first visual output to the first projection surface comprises causing the projection system to project, via the first projector and based on the location and the orientation of the head-mounted device, the first visual output in a projection direction.

5. The system of claim 1, wherein the first projection surface is included in a combiner that is configured to optically modify the first visual output by changing an apparent optical distance of the first visual output from the first eye.

6. The system of claim 5, wherein the head-mounted device includes an auxiliary optical element configured to direct the first visual output to the first projection surface via the combiner.

7. The system of claim 1, wherein:
the head-mounted device includes a second projection surface; and
the projection system is further configured to project a second visual output onto the second projection surface to cause a second portion of the visual information to be displayed to a second eye of the user.

8. The system of claim 7, wherein the processing unit is further configured to execute instructions to cause the projection system to project the second visual output to the second projection surface, and the first portion of the visual information is different than the second portion of the visual information.

9. The system of claim 8, wherein the processing unit is further configured to execute instructions to generate the first portion of the visual information and the second portion of the visual information so that the user perceives the visual information stereoscopically.

10. The system of claim 9, wherein the processing unit is further configured to execute instructions to generate the first portion of the visual information and the second portion of the visual information so that the user perceives at least a portion of the visual information to be located within the vehicle.

11. The system of claim 9, wherein the processing unit is further configured to execute instructions to generate the first portion of the visual information and the second portion of the visual information so that the user perceives at least a portion of the visual information to be located outside the vehicle.

12. A method for displaying visual information to a user of a vehicle, the method comprising:
receiving current location and orientation information for a head-mounted device of the user;
determining, based on the current location and orientation information, a transformation function to be applied to image data for display to the user;
modifying, based on the transformation function, the image data to generate display data;
selecting, from a set of projectors included in a projection system and based on the current location and orientation information, a first projector, wherein the projection system is external to the head-mounted device; and
causing, the projection system to project, via the first projector and based on the display data, a first visual output to a first projection surface of the head-mounted device.

13. The method of claim 12, wherein the current location and orientation information for the head-mounted device is received from a sensor external to the head-mounted device.

14. The method of claim 12, wherein modifying the image data to generate the display data comprises:
generating a first portion of display data for the projection of the first visual output to the first projection surface; and
generating a second portion of display data for the projection of a second visual output to a second projection surface of the head-mounted device.

15. The method of claim 14, further comprising projecting the second portion of display data to the second projection surface.

16. A system for displaying visual information to a user of a vehicle, the system comprising:
a projection system that includes a set of two or more projectors configured to be incorporated into the vehicle, and configured to project at least a first visual output onto a first projection surface of a head-mounted device of the user to cause at least a first portion of the visual information to be displayed to a first eye of the user;
a position-tracking system configured to be incorporated into the vehicle and configured to determine:
a location of the head-mounted device with respect to the projection system, and
an orientation of the head-mounted device with respect to the projection system; and
a processing unit configured to be incorporated into the vehicle and configured to execute instructions to:
generate, based on the location and the orientation of the head-mounted device, the first visual output,
select, from the set of projectors and based on the location and the orientation of the head-mounted device, a first projector; and
cause the projection system to project, via the first projector, the first visual output to the first projection surface.

17. The system of claim 16, wherein the set of projectors includes at least one projector configured to be installed on an interior surface of the vehicle.

18. The system of claim 16, wherein the position-tracking system includes at least one position-tracking sensor configured to be installed on an interior surface of the vehicle.

19. The system of claim 16, wherein:
the first projector is further configured to project the first visual output to the first projection surface when the head-mounted device is in a first location with a first orientation; and
a second projector of the set of projectors is configured to project the first visual output to the first projection surface when the head-mounted device is in a second location with a second orientation.

20. The system of claim 16, wherein:
the head-mounted device includes a second projection surface;
the first projector is further configured to project the first visual output to the first projection surface; and
a second projector of the set of projectors is configured to project a second visual output to the second projection surface.

* * * * *

UNITED STATES PATENT AND TRADEMARK OFFICE
CERTIFICATE OF CORRECTION

PATENT NO. : 10,885,819 B1  
APPLICATION NO. : 16/530935  
DATED : January 5, 2021  
INVENTOR(S) : Joseph Verbeke, Sven Kratz and Stefan Marti Page 1 of 1

It is certified that error appears in the above-identified patent and that said Letters Patent is hereby corrected as shown below:

In the Claims

Column 14, Claim 1, Line 42, please delete "determine;" and insert --determine:--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*